(12) United States Patent
Chen et al.

(10) Patent No.: US 11,574,465 B2
(45) Date of Patent: Feb. 7, 2023

(54) IN-SEASON FIELD LEVEL YIELD FORECASTING

(71) Applicant: CLIMATE LLC, Saint Louis, MO (US)

(72) Inventors: Yaqi Chen, Chesterfield, MO (US); Gardar Johannesson, Oakland, CA (US); Wei Guan, Pleasanton, CA (US)

(73) Assignee: CLIMATE LLC, Saint Louis, MO (US)

( * ) Notice: Subject to any disclaimer, the term of this patent is extended or adjusted under 35 U.S.C. 154(b) by 206 days.

(21) Appl. No.: 16/725,869

(22) Filed: Dec. 23, 2019

(65) Prior Publication Data

US 2020/0202127 A1 Jun. 25, 2020

Related U.S. Application Data

(60) Provisional application No. 62/784,252, filed on Dec. 21, 2018.

(51) Int. Cl.
*G06V 20/00* (2022.01)
*G06V 20/10* (2022.01)
(Continued)

(52) U.S. Cl.
CPC .......... *G06V 20/188* (2022.01); *G06N 20/00* (2019.01); *G06Q 10/04* (2013.01); *G06Q 50/02* (2013.01); *G06V 20/194* (2022.01)

(58) Field of Classification Search
CPC ...... G06V 20/188; G06V 20/14; G06N 20/00; G06Q 10/04; G06Q 50/02
(Continued)

(56) References Cited

U.S. PATENT DOCUMENTS

2012/0033878 A1  2/2012 Ma
2016/0307073 A1  10/2016 Moody
(Continued)

OTHER PUBLICATIONS

International Searching Authority, "Search Report" in application No. PCT/US2019/068306, dated Mar. 25, 2020, 11 pages.
(Continued)

*Primary Examiner* — Michael R Neff
(74) *Attorney, Agent, or Firm* — Harness, Dickey & Pierce, P.L.C.

(57) ABSTRACT

In an embodiment, digital images of agricultural fields are received at an agricultural intelligence processing system. Each digital image includes a set of pixels having pixel values, and each pixel value of a pixel includes a plurality of spectral band intensity values. Each spectral band intensity value describes a spectral band intensity of one band among several bands of electromagnetic radiation. For each of the agricultural fields, spectral band intensity values of each band are preprocessed at a field level using the digital images for that agricultural field resulting in preprocessed intensity values. The preprocessed intensity values are provided as input to a machine learning model. The model generates a predicted yield value for each field. The predicted yield value is used to update field yield maps of agricultural fields for forecasting and can be displayed via a graphical user interface (GUI) of a client computing device.

25 Claims, 12 Drawing Sheets

(51) Int. Cl.
*G06Q 50/02* (2012.01)
*G06Q 10/04* (2012.01)
*G06N 20/00* (2019.01)

(58) Field of Classification Search
USPC .......................................................... 382/110
See application file for complete search history.

(56) References Cited

U.S. PATENT DOCUMENTS

| | | | |
|---|---|---|---|
| 2017/0039449 A1* | 2/2017 | Scharf | G06V 20/188 |
| 2017/0161560 A1 | 6/2017 | Itzhaky et al. | |
| 2017/0357872 A1 | 12/2017 | Guan et al. | |
| 2018/0209949 A1* | 7/2018 | Shriver | G06Q 10/109 |
| 2018/0330435 A1* | 11/2018 | Garg | G06Q 30/0283 |
| 2019/0277749 A1* | 9/2019 | Rushing | A01G 22/00 |

OTHER PUBLICATIONS

Current Claims in application No. PCT/US2019/068306, dated Mar. 2020, 5 pages.
International Bureau, "International Preliminary Report on Patentability" in application No. PCT/US2019/068306, dated Jul. 1, 2021, 7 pages. Examiner.
Bin Luo et al., "Crop Yield Estimation Based on Unsupervised Linear Unmixing of Multidate Hyperspectral Imagery" IEEE Transactions On Geoscience and Remote Sensing, vol. 51, No. 1, Jan. 2013. (12 pages).

* cited by examiner

FIG. 2
(a)
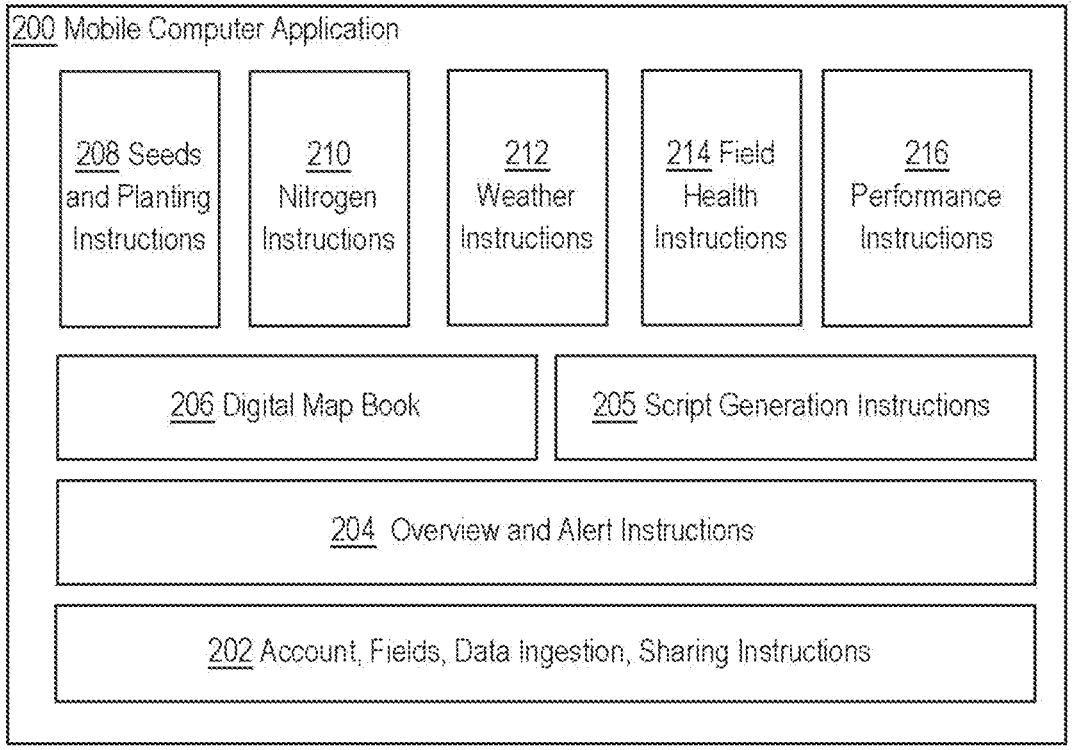
(b)
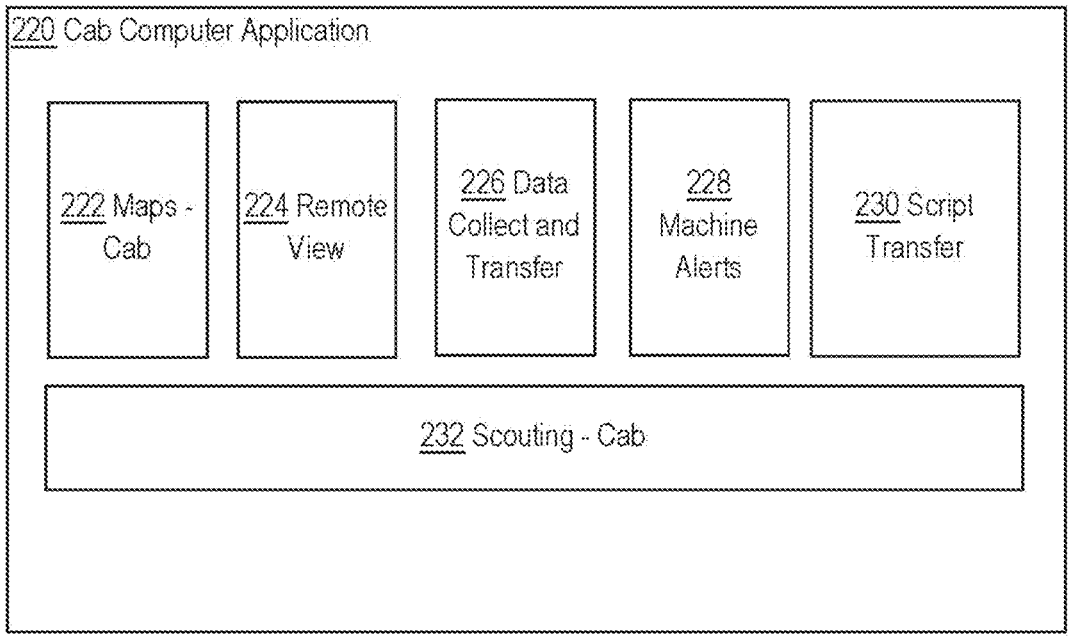

FIG. 5

Data Manager

Nitrogen | Planting | Practices | Soil

Planting 1(4 Fields)
Crop: Corn Product
Plant Date: 2016-04-12
ILU 112 | Pop: 34000
[Edit] [Apply]

Planting 2(0 Fields)
Crop: Corn Product
Plant Date: 2016-04-15
ILU 83 | Pop: 34000
[Edit] [Apply]

Planting 3(0 Fields)
Crop: Corn Product
Plant Date: 2016-04-13
ILU 83 | Pop: 34000
[Edit] [Apply]

Planting 4(1 Fields)
Crop: Corn Product
Plant Date: 2016-04-13
ILU 112 | Pop: 34000
[Edit] [Apply]

+
Add New
Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC62-M | 112 | 160 | 34000 | Apr |
| ☐ Austin, MN 1<br>Corn \| 100 \| Fredricks, MN | Corn | — | DMC62-M | 114 | 160 | 36000 | Apr |
| ☐ Boone, IN 1<br>Corn \| 100 \| Boone, IA | Corn | — | DMC62-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

FIG. 6

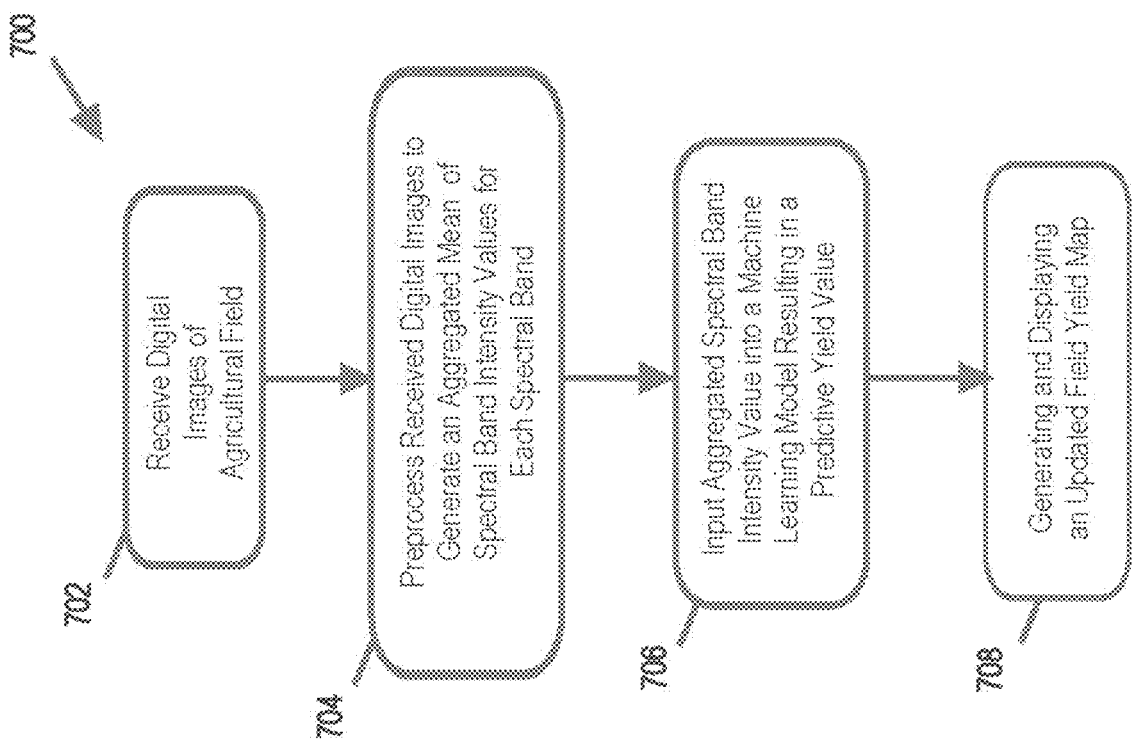

 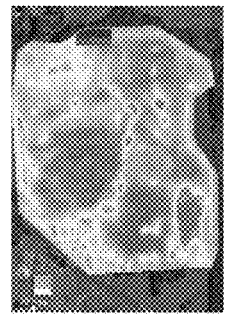 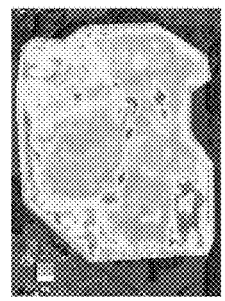 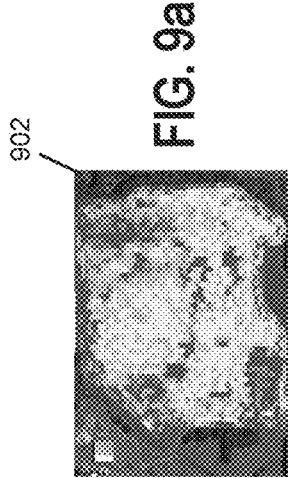
July 11, 2015    July 24, 2015    Aug 23, 2015    FIG. 9a Yield Map
Soy
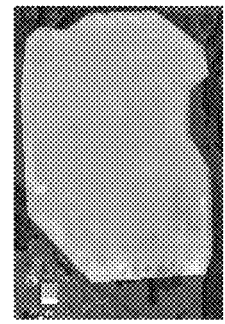 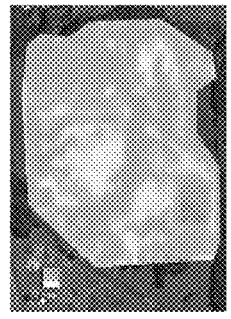 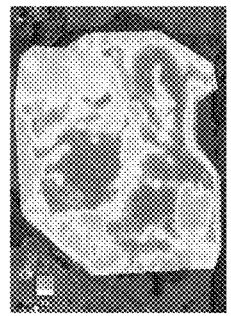 
June 24, 2016    July 27, 2016    Aug 28, 2016    FIG. 9b Yield Map
Corn

IN-SEASON FIELD LEVEL YIELD FORECASTING

CROSS-REFERENCE TO RELATED APPLICATIONS, BENEFIT CLAIM

This application claims the benefit under 35 U.S.C. § 119(e) of provisional application No. 62/784,252 filed Dec. 21, 2018, the entire contents of which is hereby incorporated by reference as if fully set forth herein, under 35 U.S.C. § 119(e).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

The present disclosure relates to computer systems and computer-implemented processes that are configured to receive aerial image data (e.g., satellite-based digital images) of agricultural fields, transform the image data into appropriate resolutions (e.g., spatial and/or temporal resolutions), and use the transformed image data together with other feature(s) (e.g., crop yield data) to address the challenge of accurately forecasting or modelling agricultural crop yield predications at a field level.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Agricultural production requires significant strategy and analysis. In many cases, agricultural growers, such as farmers or others involved in agricultural cultivation, are required to analyze a variety of data to make strategic decisions before and during the crop cultivation period. In making such strategic decisions, growers rely on computer-implemented crop yield forecast models to determine their cultivation strategy. Crop yield forecast models may help a grower decide how to spend or conserve in key areas that affect cultivation, such as fuel and resource costs, equipment investments, crop related insurance, and crop cultivation manpower.

Remote sensing imagery captured from satellites has been used to complement traditional weather data because of their finer spatial resolutions, greater availability in the globe, and their ability to capture measurements during the crop season. However, remote sensing imagery used to estimate end of season production potentials has been limited to estimating crop yields at a county, regional, or state level. Larger estimations at the county, regional, or state level do not take into account variations within a field and may only represent a more generalized estimation at the field specific level.

Even when available, field-level imagery data sample sets can be very large (big data) making calculating predicted yield estimations impractical and difficult. Additionally, large physical data storage units and specialized computing devices are required to process the big data.

Therefore, improved computer-implemented for modeling crop yields at a field specific level are desirable.

SUMMARY

The appended claims may serve as a summary of various embodiments of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

FIG. 7 depicts a flow chart of an example method for determining in-season predicted yield values for agricultural fields.

FIG. 9a and FIG. 9b each depict deep learning image-based yield models for the two example crops.

DETAILED DESCRIPTION

Figure 1:
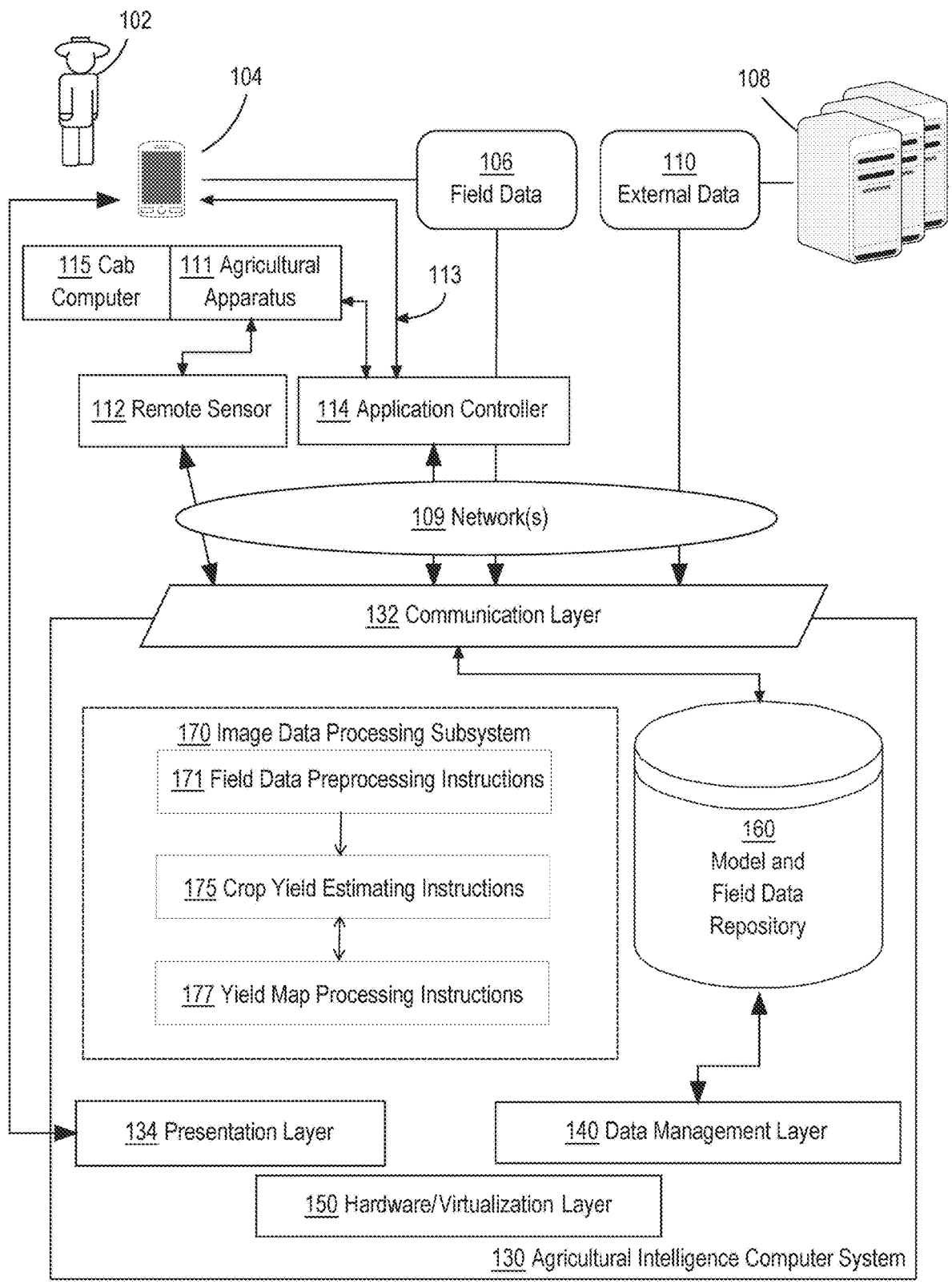
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
   1. GENERAL OVERVIEW
   2. EXAMPLE AGRICULTURAL INTELLIGENCE COMPUTER SYSTEM
     2.1. STRUCTURAL OVERVIEW
     2.2. APPLICATION PROGRAM OVERVIEW
     2.3. DATA INGEST TO THE COMPUTER SYSTEM
     2.4. PROCESS OVERVIEW—AGRONOMIC MODEL TRAINING
     2.5. IMPLEMENTATION EXAMPLE—HARDWARE OVERVIEW

3. EXAMPLE PROCESS OF FIELD-LEVEL YIELD ESTIMATION USING IN-SEASON SATELLITE DIGITAL IMAGES AND DEEP LEARNING MODELS

1. General Overview

The present disclosure uses aerial image data of agricultural fields obtained during a growing season (current and/or prior seasons) and machine learning models to improve crop yield predictions at the field level. In an embodiment, the yield predictions are used to update yield maps for fields, and the yield maps are displayed through a graphical user interface or otherwise used to help guide real-world considerations in determining and implementing crop cultivation and management strategies. The techniques and yield predictions described herein may further be used to create application parameters for an application controller, thereby improving the performance of farming implements controlled by the application controller.

Aerial image data, such as obtained by satellite image sensors, represent an agricultural field by digital images. Digital images of a region including one or more fields accumulate over time, such that there may be millions of available satellite images that can be processed and applied to a machine learning model for yield prediction. These accumulated digital images represent different locations or spatial resolutions, because the images are captured as the image sensor (e.g., satellite) moves and passes over the region. Further, the digital images also represent different times or temporal resolutions, because the image sensor typically moves and passes over a region with a variable period.

Various techniques are provided for transforming the image data so that a server computer or data processing system can effectively and efficiently use large sets of spatially and temporally variable image data for forecast and/or hindcast yield prediction at a field level. The techniques include, for instance, adding a binary indicator to spectral band values of each image, which binary indicator provides data regarding the availability of actual image data for a given period, e.g., for a given day.

The techniques also include merging image data across an entire growing season into a representative value used in a machine learning model, which helps to address the technical challenge of processing big data. More particularly, transforming the large amount of image band data into representative values reduces the amount of feature data for the machine learning model, and thereby helps to require fewer CPU cycles, uses less memory, storage, and network bandwidth. Preprocessing may include computing an aggregated spectral band intensity mean value or computing a histogram vector from spectral band intensity values of the pixels of all digital images of a field, per day. According to an embodiment, the server computer or data processing system calculates, for each (spectral) band, the average (or mean) value of the spectral band intensity values of pixels across each digital image of a set of digital images. In this embodiment, the server computer or data processing system concatenates the calculated averages, per band, to generate an average (or mean) for all images of a field, per band.

These techniques and other described in more detail herein contribute to the technical character of the disclosure by helping to efficiently and effectively process large datasets and simultaneously modeling spatial and temporal data in the datasets in order to provide accurate yield predictions.

A computer-implemented method and system is disclosed for receiving, at an agricultural intelligence processing system, digital images of agricultural fields. Each agricultural field is represented by one or more digital images obtained in-season (in the same planting season) or in different planting seasons. Each digital image of an agricultural field includes a set of pixels having pixel values, each pixel value of a pixel including a plurality of spectral band intensity values representing the spectral band intensities of a band among several bands of electromagnetic radiation. For each of the agricultural fields, spectral band intensity values of each band are preprocessed at field level, using all the digital images for that agricultural field resulting in preprocessed intensity values. The preprocessed intensity values are stored and the stored preprocessed spectral band intensity values for each field are input to a trained machine learning model. The model generates a predicted yield value for each field. The predicted yield value is used to update field yield map(s) of agricultural field(s) for forecasting and can be displayed to a user with a graphical user interface (GUI) of a client computing device.

2. Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates, or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data, respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
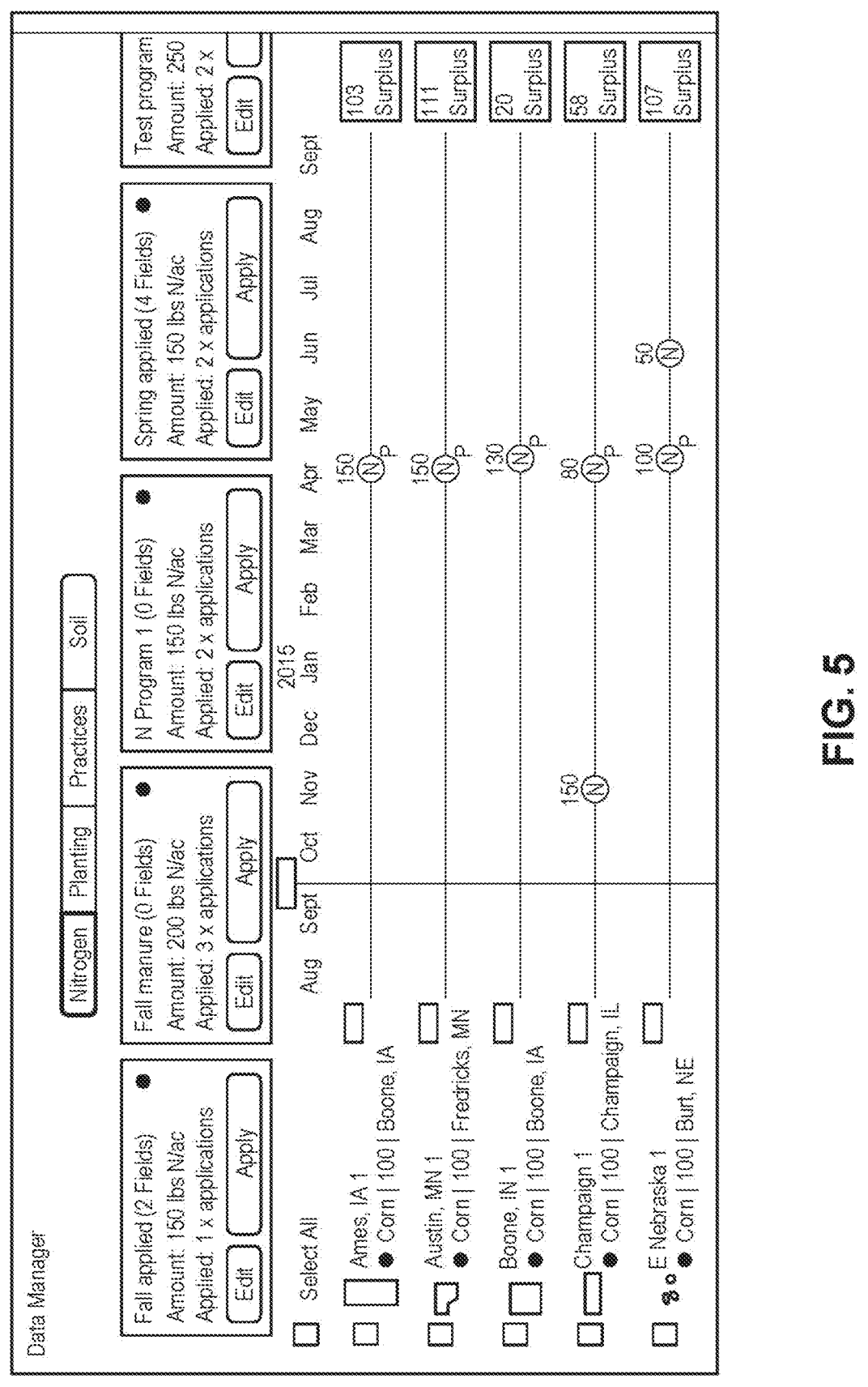

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Referring to FIG. 1, the agricultural intelligence computer system 130 is shown to comprise an image data processing subsystem 170, which in turn is shown to comprise field data preprocessing instructions 171, crop yield estimating instructions 175, and yield map processing instruction 177. In an embodiment, each of field data preprocessing instructions 171, crop yield estimating instructions 175, and yield map processing instruction 177 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the field data preprocessing instructions 171 may comprise a set of pages in RAM that contain instructions which when executed cause performing the target identification functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of field data preprocessing instruction 171, crop yield estimate instructions 175, and yield map processing instructions 177 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
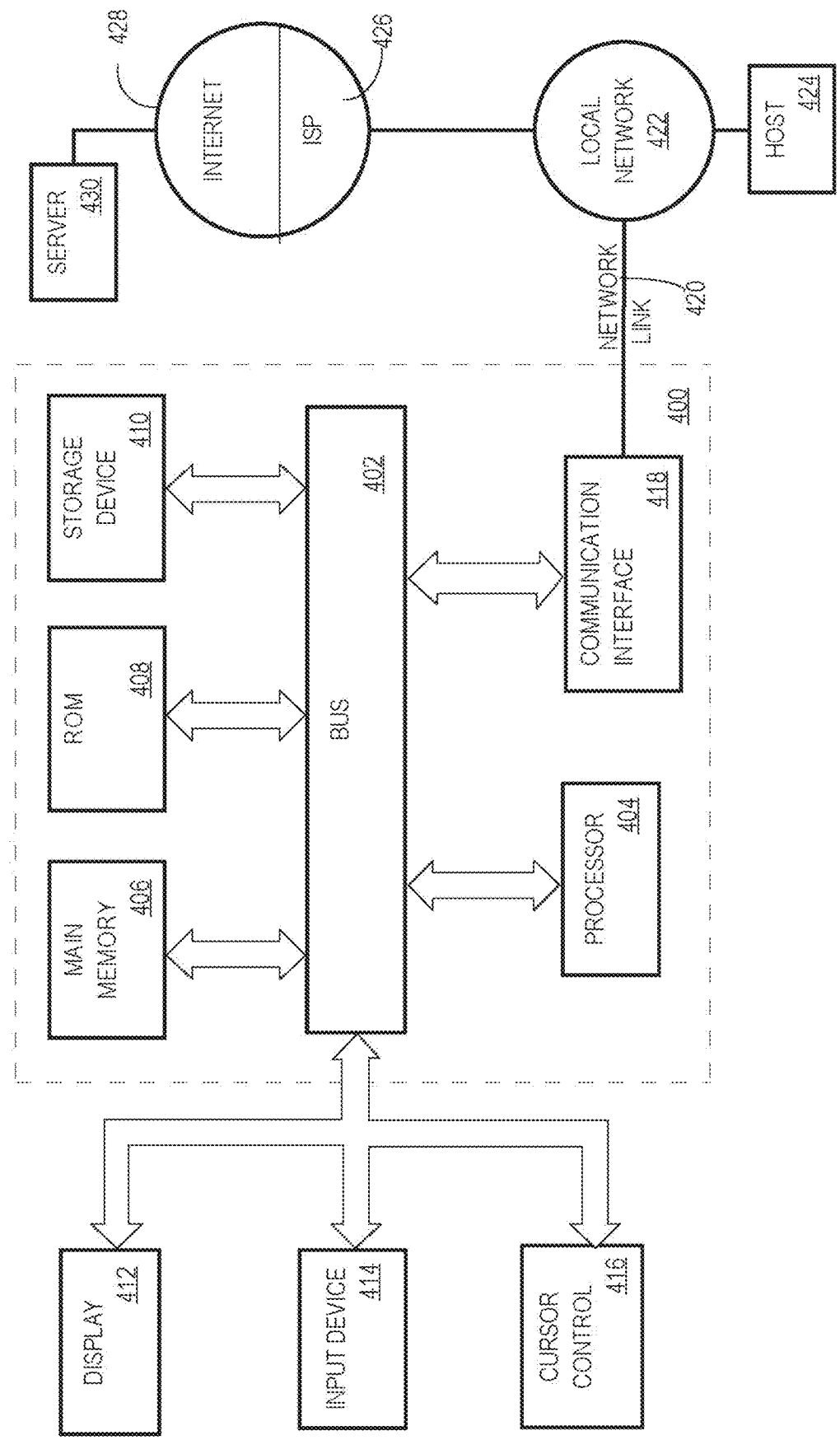
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate, or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging, and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement, and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights, and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage, and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
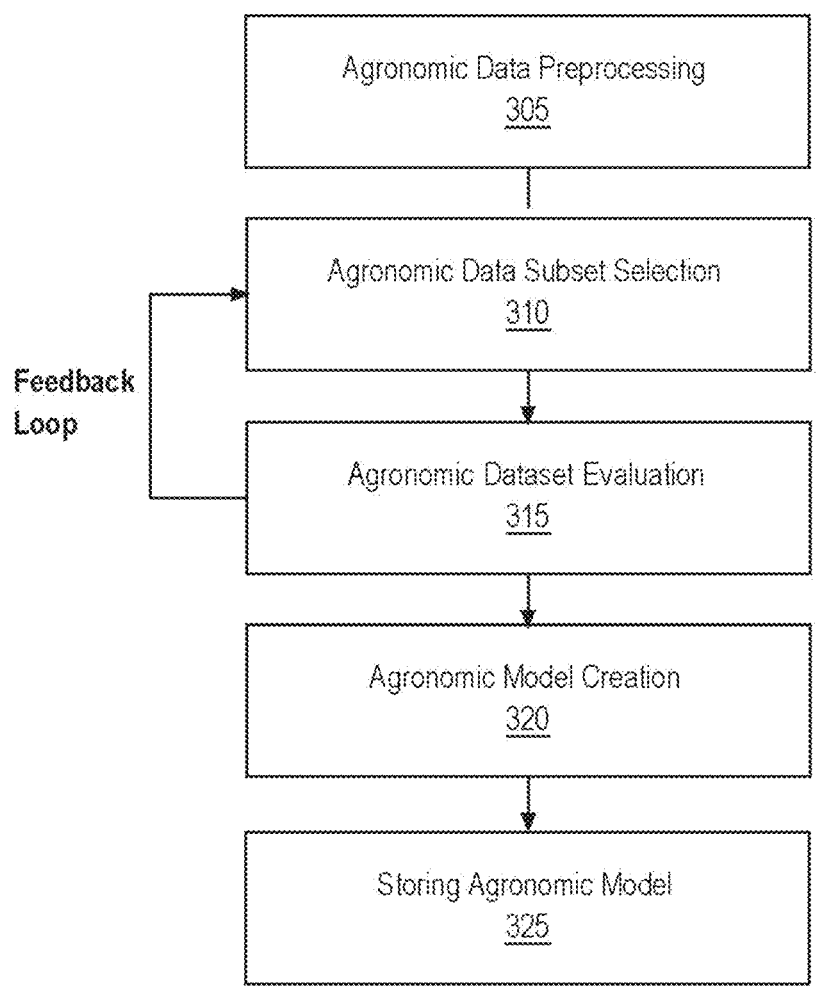
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic, or optical signals that carry digital data streams.

The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

Processor 404 may execute code as it is received, and/or store the code in storage device 410 or other non-volatile storage for later execution.

3. Example Process of Field-Level Yield Estimation Using In-Season Satellite Digital Images and Deep Learning Models In an embodiment, historical data for agricultural fields during one or more planting seasons, such as in-season satellite imagery, are used to determine in-season, or for a different season, field-level predicted yield values. The historical data generally includes one or more field-level digital images of the agricultural fields captured via satellites, aircraft, or other aerial image sensor, which after preprocessing and feature engineering are provided as input to a machine learning model to determine or predict future yields of the same or different agricultural fields. The predicted yields are effectively a priori information for improving future in-season crop yields. Yield prediction has been a long-standing problem in smart agriculture for many years, and previous efforts have been limited to national, state or county-level estimates based upon data availability issues. The availability of large-scale field-level data is a foundation for improved estimates that are consumable by deep-learning models such as long-short term memory (LSTM) neural networks and random forest (RF) models, and can result in computational performance that is comparable to other yield models operating at the county level—that is, far faster and more efficient than before. At the same time, the use of millions of satellite digital images of fields as input is possible only with different computational methods as described herein to help reduce necessary CPU cycles, memory and storage requirements, and network bandwidth.

FIG. 7 illustrates an example computer-implemented method for determining in-season (or for subsequent seasons) predicted yield values of agricultural fields in an embodiment. The resulting yield values can form a basis for improved seed placement calculation strategies in actual fields having particular environmental conditions. According to one example, the agricultural intelligence computer system 130 of FIG. 1 is programmed or configured to perform the functions of flowchart 700 of FIG. 7. For instance, the image data processing subsystem 170 may execute instructions to implement functionality as described further herein.

At block 702 of flowchart 700, in-season digital images of agricultural fields are received. For example, the image data processing subsystem 170 may execute field data preprocessing instructions 171 (FIG. 1) to receive a plurality of in-season digital images that have been captured by satellite or aircraft. Table 1 provides example specifications of satellite image sources, including RapidEye, Sentinel-2, LandSat-8, and Planet Dove, for providing suitable image data for use in the present disclosure.

TABLE 1

| Sensors | RapidEye | Sentinel-2 | LandSat-8 | Planet Dove |
|---|---|---|---|---|
| Image Frequency | 7-10 days | 5-7 days | 16 days | daily |
| Resolution | 5 m | 10/20/60 m | 30 m | 3 m |
| Coverage | Iowa | Iowa | US | Iowa |
| Bands | RGB, NIR, RedEdge | RGB, NIR, 4 RedEdge, 2 SWIR, water vapor | RGB, NIR, 2 SWIR | RGB, NIR |
| Years | 2015-2017 | 2016-2018 | 2013-2018 | 2017 |
| # Fields | 50k | 110k | 600k | 1.7k |
| # Images | 1.4 Million | 5 Million | 20 Million | 0.6 Million |

The specifications in Table 1 provide an image frequency range, which relates generally to how frequently a given satellite sensor passes over a particular field or geographic area in order to be in position to provide a digital image of the field. The resolutions are listed in a meter scale. The coverage row in the example of Table 1 refers to Iowa and may include other states in the U.S., such as Illinois, Minnesota, Missouri, Iowa, North Dakota, South Dakota, Kansas, Nebraska, Ohio, Indiana, Wisconsin, Kentucky, and Michigan. Further, the satellite images may include data in a plurality of bands, such as Red (R), Green (G), Blue (B), Near-Infrared (NIR), Red-Edge (RE), short wave infrared (SWIR)—SWIR1 has a wavelength in the range of about 1.55-1.75 micrometers and SWIR2 has a wavelength in the range of about 2.10-2.35 micrometers, water vapor, etc. Further, Table 1 identifies example timeframes when a number of images was collected for a number of fields.

Table 2 provides example data for a given field, and includes a field identifier, area measurements of a series of images for the field, days of the year corresponding to the series of images, image band data.

TABLE 2

| | |
|---|---|
| field_id | 0000b430-3714-4ecd-b2ea-eb89ed9137f5 |
| area_image | [68.681725, 68.681725, 68.681725,68.681725, 6...] |
| blue_mean | [0.6493576187335093, 0.13825926781002637, 0.09...] |
| day_of_year | [76, 156, 172, 252, 268, 284] |
| green_mean | [0.6271281002638522, 0.14518146437994722, 0.08...] |
| nir_mean | [0.6271856200527705, 0.28940712401055413, 0.29...] |
| red_mean | [0.6654893799472296, 0.16386649076517149, 0.07...] |
| swir1_mean | [0.023810949868073878, 0.3635414577836412, 0.2...] |
| swir2_mean | [0.023396108179419523, 0.32648598284960423, 0....] |
| crop_year_season | 2014 |

Each agricultural field may have one or more digital images over a given timeframe. In some cases, depending on climate and/or environmental conditions, for example, an agricultural field may have no digital image over the given timeframe. A received digital image includes a set of pixels with a plurality of pixel values, and a pixel value includes one or more spectral band intensity values. A spectral band intensity value describes a spectral band intensity of a spectral band of electromagnetic radiation. Example spectral bands and their use are described above and in other sections herein.

At block 704, the image data processing subsystem 170 performs preprocessing on the received digital images to generate an aggregated mean of spectral band intensity values for each spectral band, for each field. In an embodiment, the resulting spectral band intensity values are stored in model and field data repository 160 (FIG. 1). In other embodiments, in-memory storage may be used to store the resulting spectral band intensity values.

At block 706, the image data processing subsystem 170 provides the aggregated spectral band intensity values as an input to a trained machine learning model, which results in a single predicted yield value. For example, the image data processing subsystem 170 may execute the crop yield estimating instructions 175 (FIG. 1) to cause the spectral band intensity values to be provided to a machine learning model for evaluation via the model.

At block 708, based on the predicted yield value, an updated field yield map for the same or different agricultural fields may be generated and displayed. For example, the image data processing subsystem 170 may execute yield map preprocessing instructions 177 to perform the function of generating and displaying yield maps. In some embodiments, yield maps are displayed through a graphical user interface of a client computing device, such as field manager computer device 104. The predicted yield values and updated field yield maps may be saved in the model and field data repository 160.

Figure 8:
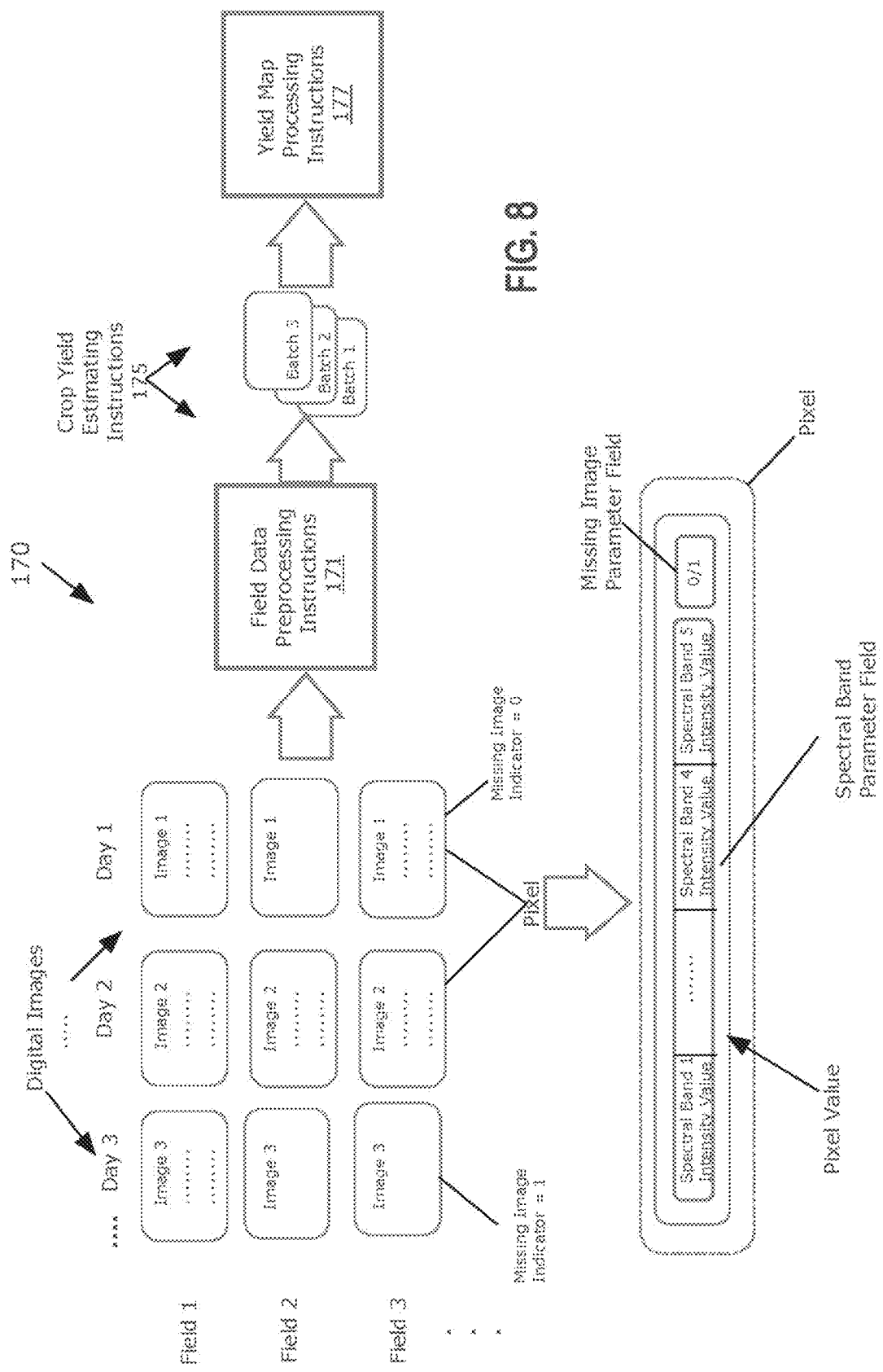
FIG. 8 depicts a block diagram of an example implementation of an agricultural intelligence computer system.

FIG. 8 depicts a block diagram of an implementation of the agricultural intelligence computer system for use in yield estimation with satellite imagery. In an example of FIG. 8, the image data processing subsystem 170 executes field data preprocessing instructions to receive satellite imagery of in-season and field level digital images. Each field may have one or more or no digital images over a given timeframe. A digital image comprises a set of pixels, and each pixel is represented by a pixel value. Each pixel value includes a set of spectral band intensity values with each spectral band intensity value corresponding to a spectral band intensity of a corresponding pixel.

The image data processing subsystem 170 further executes field data preprocessing instructions 171 to preprocess the received digital images at the field level. In some embodiments, preprocessing includes removing cloud imagery or other artifacts from top of the atmosphere (ToA) data sets and/or normalizing values of the received digital images to a same value scale. The image data processing subsystem 170 executes crop yield estimating instructions 175 to provide preprocessed field data sets as input to a machine learning model. In an example, the image data processing subsystem 170 executes the crop yield estimating instructions 175 to organize the preprocessed field data sets into batches of data that are provided as input to the machine learning model.

In an example embodiment, the spectral band intensities of pixels may include Red (R), Green (G), Blue (B), Near-Infrared (NIR), and Red-Edge (RE). Other examples may include fewer, additional, and/or different spectral bands. The preprocessing output, from field data preprocessing instructions block 171, is made of the total number of spectral band intensity values for each spectral band of pixels of the set of received digital images of a field, which serves as input to a machine learning model. In the example above with 5 spectral bands per pixel, each preprocessed pixel value includes 5 values, one value for each spectral band intensity. During operation, the machine learning model generates a single predicted yield value from the preprocessed data, at crop field estimating instructions block 177. The predicted yield value is subsequently used for forecasting the yield for the same and/or different fields.

In an example, the machine learning model is a deep learning algorithm that when executed generates a trained in-memory model or network of data that when applied to data sets of digital images produces a single predicted yield value. In various embodiments, the machine learning model is trained in-season and at field level. Predicted yield values may be periodically updated, in-season, using the trained model. The frequency of and data set size for training the model may be determinative of the yield accuracy the model produces during operation.

Expanding on the above example with 10 digital images that are received for each field during the span of a year, 10 sets of 5 preprocessed band intensity values are input to the machine learning model for prediction. The model generates a single value—predicted yield—which can be used to update an existing yield map that is displayed to a user through a graphical interface for forecasting and planning purposes.

Machine learning algorithms suitable for field level processing may provide better results with fixed-sized input data sets. Field level data sets, however, are generally not fixed in size. Field climate and environmental conditions, per day, per location, can vary significantly when a satellite passes over each field. Further, a given satellite passes over each field periodically, and may do so with a variable frequency. In addition, as a given satellite does pass over fields, some field may be covered by clouds while other fields are cloud-free. In the example above, 5 preprocessed band values for each day are provided as input to the model, but these inputs do not necessarily correspond to days where the satellite happens to pass over a field. In accordance with an embodiment, for days with missing images or inadequate image data, 5 values of spectral band intensities are imputed for the fields, which has the effect of changing to a fixed size the input data set provided to the model. Alternatively, days with missing or inadequate image data remain without associated data.

In an example with a 180 day growing season, 180 sets of 5 preprocessed band values are generated by the model. The model may be implemented by a table that is stored in memory and accessed during operation of the machine learning model for forecasting. In this example, a table (or matrix) of 180×5 preprocessed band values are generated. Additionally, an indicator ("missing image indicator") for each day is generated to help the model treat missing/inadequate data differently than available data. An example missing image indicator is a binary bit that is equal to a binary value of '0' if the 5 band values for a corresponding day, for a field, are satellite images, and equal to a binary value of '1' if the 5 band values are imputed or empty (e.g., when there is no satellite image data or inadequate image data). In this example, when there is no imagery data, the corresponding image band values are each zero and the missing image indicator has a value of '1', and when there is imagery data, the corresponding image band values are typically each non-zero and the missing image indicator has a value of '0', which helps to provide more useful gradient information for the model to learn.

In a scenario where the machine learning model is operational through an entire growing season, such as 180 days (from the day the field is initially planted), the input to the machine learning model is a matrix of 180×5 datasets of preprocessed band values in addition to 180 missing image indicators that represent whether the corresponding 5 values in a given day are actuals or estimates/empty. The model uses these values to generate an estimate of the average yield of a field and the estimated average yield is used for forecasting. The terms "estimate of the average field", "estimated average yield", and "predicted yield value", are used interchangeably herein.

Using the above example, the machine learning algorithm trains by processing a large collection of historical image data—data across many fields, during one or more years or growing seasons—which in the case of a 180 day growing season includes 180×5 band values. Supplemental data, such as without limitation, an observed/estimated cloud mask, an example of which is shown in and discussed relative to FIG. 10*a* and FIG. 10*b*, and an actual observed yield, may be used for training to determine how to leverage the input to the model to estimate the end-of-season (or subsequent season) yield.

The input image data to the model may be reduced in size by processing data sets of a shorter period within a year or growing season. With reference to the example above, the algorithm does not necessarily require input data for all 180 days. For example, the end-of-season yield may be predicted from 100 days after planting thereby only data sets from after the first 100 days up until or after harvest, not from the entire 180 days of the season, are provided as input to the model. It is understood that a growing season may be longer or shorter than 180 days and that 180 days is merely used as an example for discussion purposes.

Referring again to FIG. 8, another example implementation includes field data preprocessing instructions block 171 receiving, in order, in-season digital images for three days—Day 1, Day 2, Day 3 (or D1, D2, D3, respectively)—for three fields—Field 1, Field 2, Field 3 (or F1, F2, F3, respectively). Days D1-D3 may be random, for example, Day 2 may be three months after Day 1, or immediately following Day 2. Each of the days, D1-D3, may represent a time period other than a day, such as a month, a year, or some combination of the two. The period between each day may also vary, for example, Day 3 may be a week following Day 2 whereas Day 2 may be the day immediately following Day 1.

FIG. 8 represents each of the fields, F1-F3, with three digital image boxes, labeled Image 1, Image 2, Image 3 (or I1, I2, I3, respectively), some of which include digital images and some of which do not (e.g., no image data was available or adequate for a given day). Boxes with no dots represent no digital image and boxes with dots represent digital images. Dots in a box represent the set of pixels of a corresponding image. The number of images of a field may vary between fields and may consist of one image, more than one image, or no image. In FIG. 8, for field F1 there are 3 images I1-I3, one image per day D1-D3. Whereas, for field F2 there is one image I2 and missing images I1, I3 for days D1, D3, respectively. For field F3, there are two images I2, I3, and a missing image I3 for Day 3.

In the example of FIG. 8, each pixel value of a pixel has five spectral band intensity values, one spectral band intensity value for each spectral band, R, G, B, NIR, and RE. In another embodiment, there may be four spectral band intensity values with spectral band for blue omitted because the spectral band intensity for the color blue may be relatively less useful for picking-up vegetative images.

The field data preprocessing instruction block 171 preprocesses spectral band intensity values of the received digital images of a field, and generates an output. The crop yield estimating instructions 175 are executed to receive this output. In an example of FIG. 8, where each pixel includes five spectral band intensities and the total number of satellite imagery is six, the field data preprocessing instructions 171, when executed process a data set for 6×5×the number of pixels per digital image, per field, per day. The preprocessing output (input to the model) includes 5 preprocessed spectral band intensity values. In a practical scenario, 1.5 million data values over a time period of one year may be further processed in this manner.

Figure 10A:
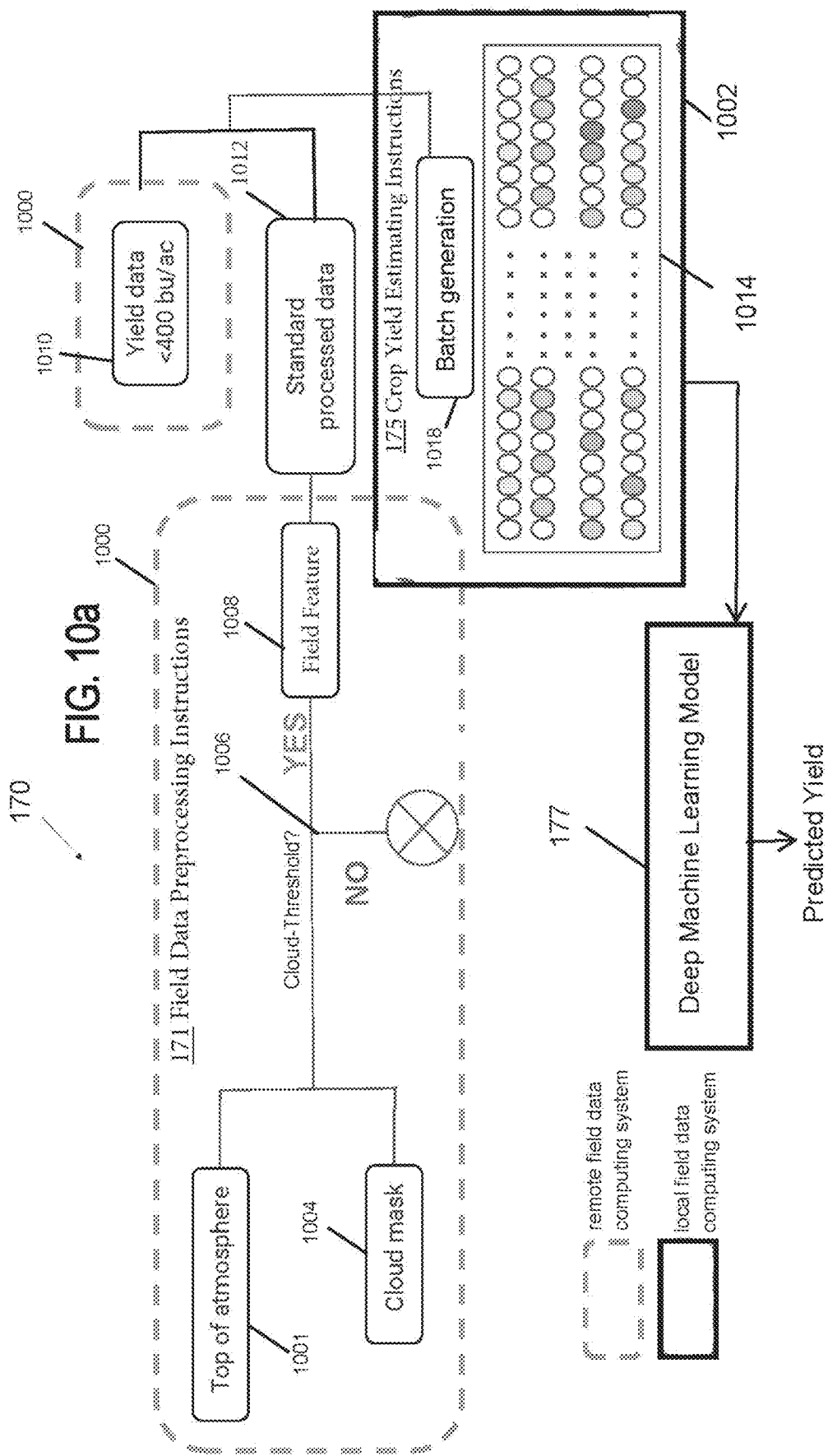
FIG. 10a and FIG. 10b each depict further details of various implementations of an agricultural intelligence computer system in block diagram form.
Figure 10B:
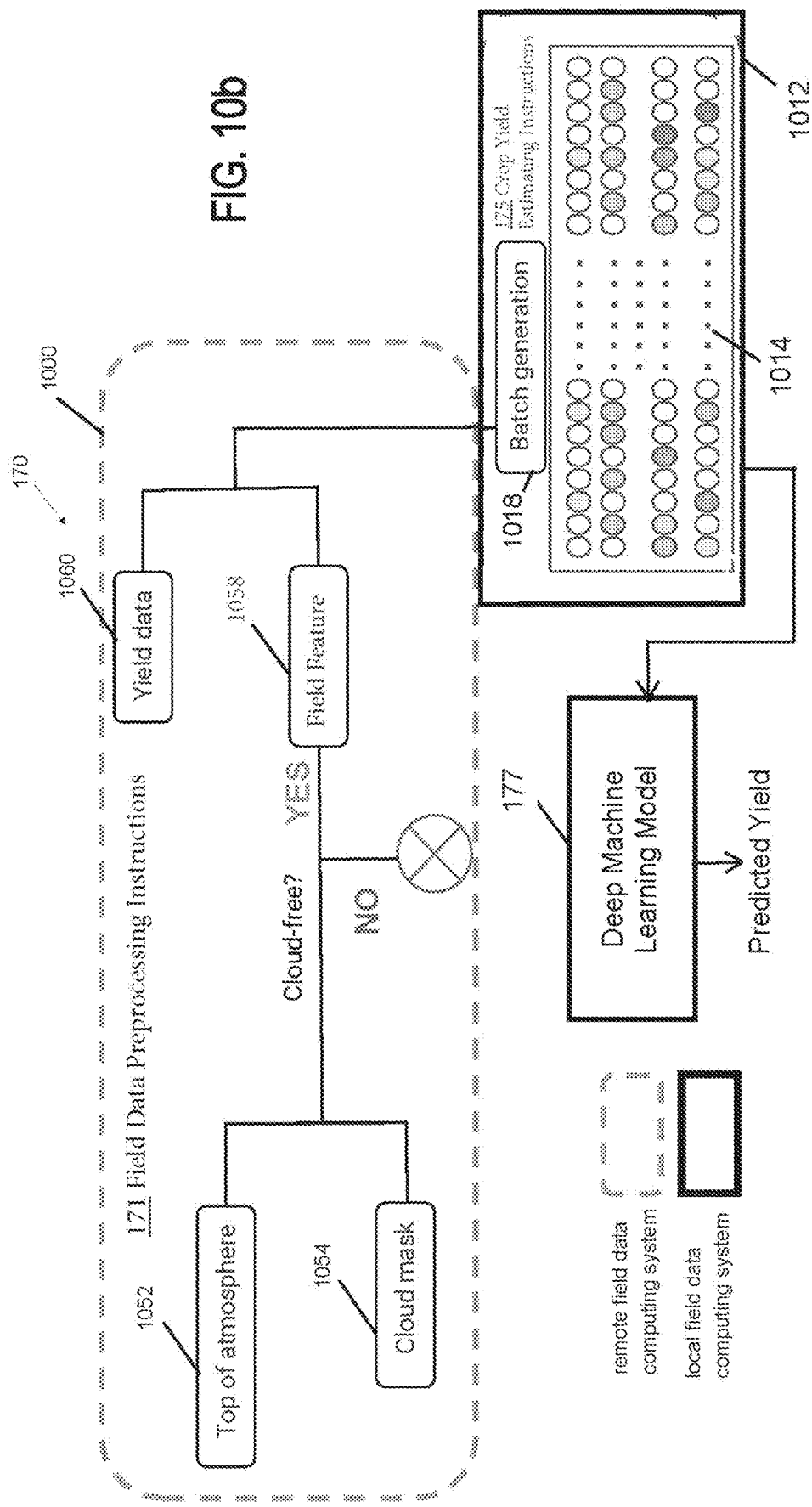

Additional detailed examples of preprocessing are discussed and shown relative to FIG. 10a and FIG. 10b. Preprocessing, for example, may include computing an aggregated spectral band intensity mean value or computing a histogram vector from the spectral band intensity values of the pixels of all digital images of a field, per day. In an embodiment of FIG. 10a, for each (spectral) band, the average (or mean) value of the spectral band intensity values of pixels across each digital image of a set of digital images is calculated and the calculated averages are concatenated, per band, representing an average (or mean) for all images of a field, per band. In this example, a single field can have multiple images corresponding to different days.

With further reference to the example of FIG. 8, for Image 1, Day 1, Field 1, the mean of the spectral intensity band values, for each spectral band is calculated. Similarly, the mean of spectral intensity band values (for each spectral band) of Image 2, Day 2, Field 1 is calculated, the mean of spectral intensity band values of Image 3, Day 3, Field 1 is calculated, the mean of spectral intensity band values of Image 1, Day 1, Field 2 is calculated, and so on. Next, the averaged spectral band intensity values 1-5 for the three digital images of the fields are concatenated with a resulting average value across all digital images of a field, per spectral band. The aggregated spectral intensity band value for each spectral band is provided as input to the machine learning model.

In the example of a histogram, the spectral band intensity values, for each band, of the pixels of each image are grouped (or bucketed) with each group having a range (or vector) of values. After obtaining a histogram vector for each image, the histogram vectors are concatenated together to represent the features of a field and are provided as input to the deep machine learning model. Further details of the histogram approach are discussed below.

Computational requirements of big data are typically costly and require large data storage. To ease of these requirements, data sets may be processed in batches (or groups) during modeling. In this respect, less specialized and therefore less costly and locally-situated computing devices may be used, albeit a series of such computing devices can process batches of data nearly simultaneously and are therefore faster.

In operation, the trained model may be used during a growing season to generate a yield forecast for a field for the current growing season and/or for a subsequent growing season. For example, in August 2019, when many new in-season images can be obtained, prediction data from the year 2018 and possibly years prior, may be used to forecast the crop yield for the year 2019. The predicted yield can then alert farmers of the yield in advance. When yield data are ready in October 2019, typically after the growing season, the previous model of 2018 and the new imagery data obtained during 2019 can be used to update the model for predicting yield for the year 2020, and the training and updating process may repeat accordingly in future years. As previously noted, supplementary data may be used for prediction as well.

Performing preprocessing operations results in data sets with no field boundaries. For example, field boundaries are no longer apparent as a result of the mean or averaging approach, as discussed herein relative to FIG. 10a, that is, after the spectral band intensity values of pixels of each digital image, per band, are averaged and the averages are concatenated. For this reason, boundaries need not be limited to field boundaries and can be based instead on other types of boundaries or self-selective criteria. By way of example, boundaries may be selected based on regions of interest within a field with a set of digital images corresponding to a boundary defining a region within a field. Regions of interest within fields may be randomly geographically located and/or based on some criteria, such as soil density or growth regions. Boundaries are therefore self-defined.

FIG. 9a and FIG. 9b each depict an example pictorial representation of a progression of processing and averaging a yield map and corresponding field imagery for model training purposes. The output of the model is a single yield number that represents the average yield value for a particular field. Contrasting colors and shades, in each figure, may be used designate various regional yields. FIG. 9a shows the progression of a soy field yield map and FIG. 9b shows the progression of a corn field yield map. FIG. 9a and FIG. 9b represent yield maps generated from a million field images during a one-year in-season period, and which are periodically updated using the deep learning models. The soy field yield map, of FIG. 9a, was updated on Jul. 11, 2015, Jul. 24, 2015, and Aug. 23, 2015. The corn field yield map was updated on Jun. 24, 2016, Jul. 27, 2016, and Aug. 28, 2016. The final yield map for each crop, shown at 902 and 904, respectively, is the culmination of the previous updates.

FIG. 10a and FIG. 10b each depict further details of various example implementations of agricultural intelligence computer system 170 in block diagram form. In FIG. 10a, averaging and aggregating (or concatenating) functions are employed and in FIG. 10b, a variation including an aggregation of histograms is employed. Generally, the processing workload is distributed between a computationally intensive computing device, which may be a remotely-located computing system, and a less computationally intensive computing device, which may be a locally-situated computing system that may include a series of distributed computing devices for faster processing. In FIG. 10a and FIG. 10b, functions performed by the former are shown in rectangles with dashed lines labeled 1000, and functions performed by the latter are shown by rectangles with solid lines labeled 1002. In FIG. 10a and FIG. 10b, functions that process large datasets and require large physical storage space are generally performed by the former, and functions that do not process large datasets and have no need for large storage space are generally performed by the latter. Various embodiments may use the PySpark open source Python application interface for Apache Spark software, the Keras deep learning framework for distributed computing, and/or Google TensorFlow, for instance.

With reference to FIG. 10a, field data preprocessing instructions block 171 receives digital satellite imagery, cropped to field level, at block 1001. The imagery is made of digital images in Top of Atmosphere (ToA) format with pixel values normalized to values between '0' and '1'. Next, the digital images are screened to remove certain image data and prevent degradation of yield estimation such as by introducing yield bias. Screening can be performed by applying one or more of several techniques. One technique is to screen the received digital images based on cloud coverage by applying a cloud mask 1004. Cloud mask 1004 is applied to the digital images to identify a percentage of cloud coverage in the digital images and compare the cloud coverage to a threshold. For each field, pixel values of digital images are compared to a corresponding threshold number that is characteristic of cloud coverage, and digital images that fail to satisfy the threshold are removed (see 1006).

Various suitable cloud and shade detection algorithms may be used, for instance, built-in cloud mask layers Fmask for LandSat-9 and Tmask for Dove, and/or other publicly available or proprietary cloud mask algorithms. Examples of techniques to screen fields for cloud coverage, without limitation, are as follows. A field image may be declared adequately cloud-free and remain for further processing if a threshold number or percent of its pixels have intensities not exceeding a predetermined threshold intensity. Alternatively, an adequately cloud-free field image may be identified by a cloud field level based on one or more spectral band intensity values of a pixel or group of pixels of a field. Yet another option is to base a cloud-free field image determination on the number of digital images with pixels or number of pixels exceeding a threshold value. Other methods of cloud-free filtering may be employed.

Cloud coverage is generally based on climate, environmental, or other similar conditions when the satellite passes over the field and satellite images are obtained. Cloud coverage can affect the quality of satellite imagery. Field images that are largely free of cloud coverage or have a tolerable level of cloud coverage remain and those with an unacceptable cloud coverage level are removed. In an example embodiment, field images with greater than ten percent cloud coverage are removed and field images with ten percent or less cloud coverage remain and are provided to field feature block 1008. The cloud mask 1004 represents values, per field, indicative of cloud coverage of a certain level of a field. A cloud coverage level is determinative of field images with an unacceptable visibility condition at the time satellite imagery is captured. In an example embodiment, pixel values for 1.4 million digital satellite images is compared with pixel values of cloud mask 1004 of a matching image size, 1.4 million, for each field. The subsequent yield value may be biased if cloud coverage is not removed prior to modeling. For instance, a predetermined threshold of 10% cloud coverage where 10% of the pixel values of the satellite image of a field indicate cloud coverage may be tolerated. Field screening in the form of a cloud mask or other cloud coverage filtering helps in computing a more reliable field image mean.

Field images with acceptable cloud coverage or no cloud coverage continue onto preprocessing at field feature block 1008, in FIG. 10a, where a field feature is applied to pixel values of the field images. In an embodiment, the field feature is an averaging/aggregating function that computes an average, for each image band, of pixel values across a digital image and concatenates the averages across field images for a given field.

According to an embodiment, field feature block 1008 applies additional engineering functions, such as image band normalization, temporal averaging, and determining location cross features, for example.

The field feature block 1008 applies image band normalization by normalizing each band of a given satellite image by the L2 norm of the bands of the same image. The L2 norm is a square root of the sum of squared pixel values. The field feature block 1008 applies image band normalization on single field-level average values for a respective image band. Since a tree based model compares each feature to an absolute threshold at each decision node, image band normalization provides a technique to allow the tree based model to make relative comparisons at each decision node. Testing results show that image band normalization can improve the mean absolute error (MAE) by up to about 0.5 bushels per acre (bu/ac), as compared to using absolute decision thresholds for image band related features. MAE is an example metric that has been found useful to measure model accuracy, however, other metrics (such as absolute error, machine absolute percentage error, root mean square error, and R-squared) can also be used to summarize and assess the quality of a machine learning model.

The field feature block 1008 applies temporal averaging to image bands by temporal decimation or averaging by a sliding time window. According to an embodiment, averaging within a time window is performed only for each valid or nonzero image band, and in practice, typically at most one valid image band exists within a four day time window. In this embodiment, temporal averaging is applied after applying band normalization. Hyperparameter tuning using a grid search has been performed and suggests that a time window duration of four days, with a window stride of four days so that there is no overlap between time windows, helps to provide good results. Further, applying temporal averaging reduces the number of features and helps to provide a simpler model that generalizes better and reduces noise.

The field feature block 1008 applies location cross features, in part, by computing arithmetic combinations of latitude (lat) and longitude (lon) values for each field centroid. Example arithmetic combinations include lat+lon, lat−lon, lat*lon, lat/lon, 2*lat+lon, 2*lat−lon, lat+2*lon, lat−2*lon, among others. These arithmetic combinations are used as location cross features to allow a machine learning model (e.g., a random forest model) to learn a potentially intricate location based model, which is particularly useful for fields where image data was missing at certain times or somehow lacked predictive power, for instance by being obscured by clouds. Testing results suggest that (1) an optimal yield predictor will likely be one that implicitly learns a detailed spatial map of an entire agricultural region, e.g., the Corn Belt, and (2) appropriately generalizing the machine learning model to help optimally learn the spatial map could provide additional prediction gain.

Notably, an overall tree depth of an RF model can be quite large, averaging about 130 levels, which is due in part to the intricate spatial map that the model implicitly learns. According to an embodiment, a maximum tree depth of 175 levels is set during training (and some trees attain this depth). In this embodiment, each tree leaf is allowed to contain as few as one sample during training, which likely impacted the tree depth, but constraining each tree leaf to contain more than one sample was found to non-negligibly increase prediction error. One additional note on location-based features and using location cross features is that a state (e.g., Iowa) may be a significant feature for a machine learning model, while a county identifier may not be. In an embodiment, further including the state as a feature helps to allow the tree based model to build more effective trees based upon large scale spatial information, and also using location cross features helps the model to learn localized spatial information than can be achieved by using the county boundaries as features.

A standardized processed data block 1012 represents a result of cloud mask processing at block 1004 and field feature determination at block 1008. In an embodiment, yield data filtering may be performed at block 1010 to ignore yield data below a threshold value. In an example embodiment, yield data less than 400 bushels per acre is used and field data greater than 400 bushels per acre are excluded or removed. The outcome of the yield data comparison is joined or merged with processed image data from block 1012 to create a master dataset for each year/location combination. The master dataset(s) are provided as input to a batch generation block 1018 of crop yield estimating instructions block 175 of FIG. 10a. The batch generation block 1018 generates batches of yield values.

According to an embodiment, the crop yield estimating instructions block 175 may perform an additional join to combine all year/location combinations into a single table. In one example, this single table contains roughly 600,000 rows, where each row corresponds to a field with associated data. This resulting table may be fairly large in size, e.g., 40-60 GB. To address the large size of the data table, one approach is to persist the data in a format that is more compatible with the present machine/deep learning and distributed framework, which may be satisfied by using a Tensorflow file format or TFRecord.

According to an embodiment, the output at field feature block 1008 is a value for each spectral band of a field. At standard processed data block 1012, processing is performed on the spectral band intensity values. Processing at block 1012 refers to distribution standardization of a number set. An example of such processing is zero-mean, unit variance standardization of an input, such as the spectral band intensity values. In an example embodiment, after processing at block 1012, the spectral band intensity values are matched with corresponding predicted yield data as the identity of the spectral band intensity values and provided as input to the deep machine learning model. In an embodiment, the field data preprocessing instructions 171 also execute functionality of the standard processed data block 1012.

As another part of the screening process, fields with yields above a predetermined threshold are eliminated. In an embodiment, fields with a yield value of greater than 400 bushels per acre are removed. Yield screening is performed to help prevent degradation of yield estimation that may be introduced by large yield bias. At crop yield estimating instructions block 175, batch generator 1018 arranges remaining yield data for fields and associated field image data from block 1012 into groups (or batches). A group of predicted yield data from random fields can form a batch or batches can be formed based on some criteria or can be random. A more random batching of the data may help to decouple the data and improve training of a machine learning model. Batches are cycled through the deep machine learning model, at crop field estimating instruction block 177, until all batches of predicted yield data are processed.

Dividing predicted yield data into batches can be performed locally and has the effect of decreasing computational stress on local computing device workload in addition to helping to increase the speed of processing. Additionally, large data storage for storing big data is unnecessary. Processing of batches may be distributed among a series of local computational devices. Batches are cycled through the machine learning model which ultimately generates a yield value, as previously discussed. Batches can be used to evaluate a trained machine learning model and/or to predict crop yield at different times in the growing season.

In FIG. 10a, a batch of predicted yield data is represented at block 1014 using a series of circles. The circles are symbolic representations of image data organized in rows or batches, and by columns or days at field level—one number (or value) per band, per field, for one day. Circles of a row may collectively correspond to the days in the planting season for a field, e.g., from planting to harvest or some shorter timeframe. A color or shading of each circle represents whether a digital image band or bands for a corresponding field is present or not. A circle with no color, an empty or unshaded circle, designates the absence of a digital image from a corresponding field for that day. Empty circles are symbolic representations of a vector of values that take the place of and are similar in format to spectral band intensity values. They can be considered place fillers and accommodate the fixed data set size requirement of some deep learning machine models. Different shadings of colored circles indicate an intensity level corresponding to a set of spectral bands. Each circle is flagged with a missing image indicator. The missing image indicator may be a tag, flag, bit, or some other form of indicator.

Each circle at 1014, in FIG. 10a and FIG. 10b, represents input to the deep machine learning model for a particular day and for a particular field. Each field has a single yield value per season. Alternatively, each circle may designate more than one type of information per field. For instance, fields with hybrid crops might have two distinct types of values. Two values can represent two regions-of-interest within a field. If a field has two (regions of interest) subregions, the sample unit is per subregion (subregion level) rather than per field (or field level). The number of subregions per field may be a number other than 2 where each circle represents a corresponding number of values.

In FIG. 10b, a top of atmosphere block 1052 performs functions of top of atmosphere block 1001, a cloud mask block 1054 performs functions of cloud mask block 1004, field feature a yield data block 1060 performs functions of yield data block 1010, and a field feature block 1058 may perform similar functions as field feature block 1008. Field feature block 1058 further represents a histogram computational function of pixels of digital images of a field. A histogram value is calculated for each spectral band of a pixel of a digital image. An example for a digital image with 1000 pixels, each pixel having a pixel value in the range of 0-1, includes dividing the pixels into 100 buckets (or groups), with each bucket having a value between '0' and '1'. A count value is calculated for the number of pixels with a spectral band intensity between the values 0-0.01 (by dividing the range 0-1 into 100 buckets). Similarly, a count value is calculated for the next bucket, i.e., the number of pixels with an intensity between 0.01-0.02, and so on. A histogram value is calculated for each band of a pixel and input to a deep learning machine model block 177.

Histograms are typically computationally complex relative to mean value calculations, for example, and produce multi-valued predicted yield data instead of a single value predicted yield data. Accordingly, workload is managed differently in the implementation of FIGS. 10a and 10b. In FIG. 10a and FIG. 10b, a yield data function block 1010, 1060 is shown performed by a specialized computing device but the output of the field feature is processed by a local machine in FIG. 10a, and by a specialized (remotely located) machine in FIG. 10b.

Figure 11:
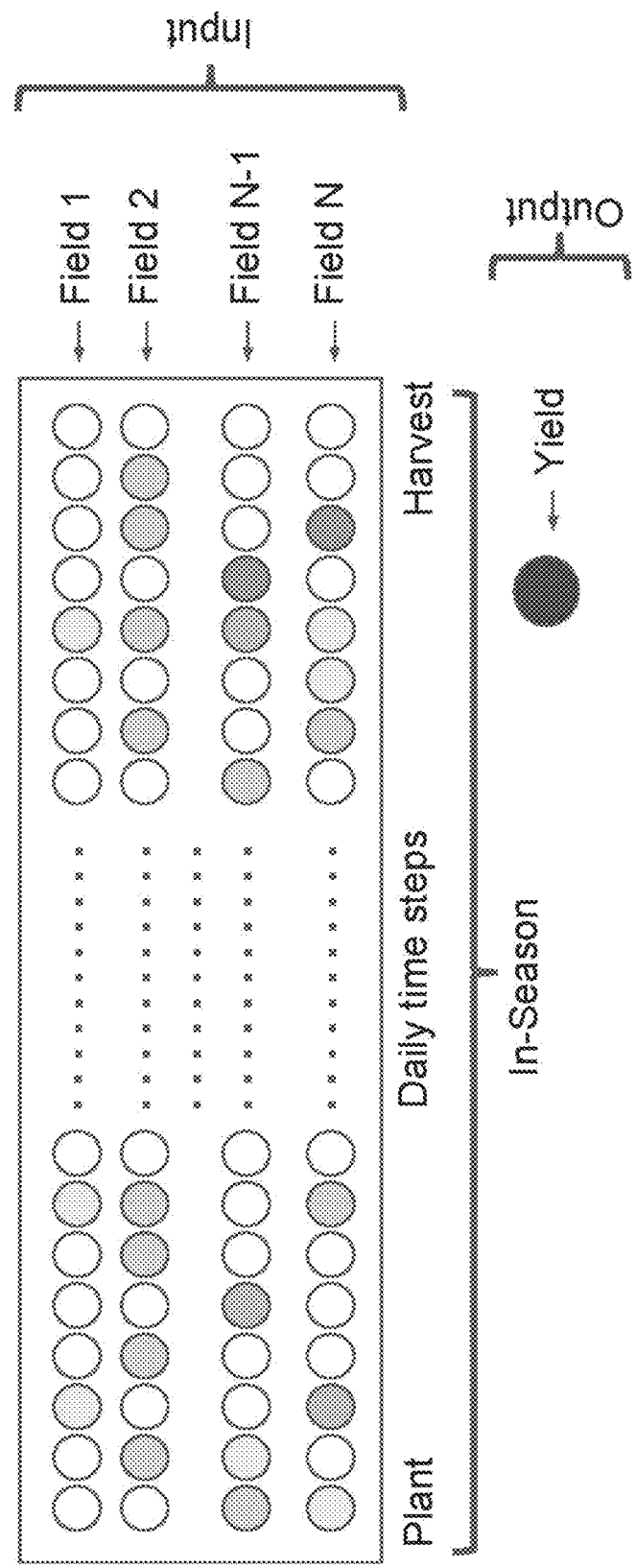
FIG. 11 depicts an example of a batch of data for an 'N' number of fields, 'N' being an integer value.

FIG. 11 shows an example of a batch of input data for fields. For purposes of illustrating a clear example, in some embodiments, a batch comprises data for a plurality of fields denoted Field 1 to Field N. For each field, a plurality of in-season data values in daily time steps are maintained, starting from a planting date and ending at a harvest date. In some embodiments, data for fields may be normalized to 180 growing days regardless of the actual number of growing days, for example, by selectively dropping duplicate values in the middle of the season. A yield value may be generated at any time in the season and the yield value may vary in magnitude or confidence level.

According to an embodiment, a random forest model containing 200 estimators (trees) is used to produce a baseline field level performance in terms of achieving the lowest mean absolute error (MAE) of the predicted yield. Scikit-learn provides a suitable random forest model that can be used to implement the modeling described herein. In this embodiment, features to the RF field level model include satellite images (e.g., Landsat-8 images) and a geospatial location of the field. A cloud mask is applied to the satellite images to exclude images with greater than 10% cloud coverage. A unique index representing the state, as well as the year, are also included as features. Yield training and test data collected from 13 states and spanning years 2013 through 2018 is provided in a comma-separated value file. Data with an observed yield exceeding 400 bu/ac are discarded. In this embodiment, the RF model is trained with a 90/10 split of the data across all years to produce a single model for all of the data, and also trained with a 90/10 split of the data from each year to produce a distinct model per year. Doing so allows for the comparison of a single joint model versus yearly specific models. Images are chronologically ordered by day of capture, starting from the 120th day of the year, spanning a total of 150 days, and without aligning by the planting date per field.

According to another embodiment, training a deep learning-based model using large data sets is facilitated by using a tool developed by Amazon Web Services called Sage-Maker. In this embodiment, SageMaker combined with Google-provided TensorFlow Estimators are used in the machine learning model training process. In an implementation, a hyperparameter tuning features is configured to select new rounds of hyperparameter combinations based on Bayesian optimization.

In another embodiment, a long-short term memory (LSTM) model is used. Generally, LSTM is known for its capability to learn from the information flow from one time point to the another, which is makes it a suitable candidate for the present use cases. However, due to the nature of satellite imagery, each field might not have images every day, which make it challenging to align the images from different fields on a given calendar day. Having many missing images leads to a very sparse time sequence, which is not ideal for LSTM to learn from. The present disclosure helps to address this challenge by averaging images (e.g., averaging every five days of images) as a more effective way of balancing missing data and information flow through different time points.

The preceding description has shown effectively how in-season satellite imagery for agricultural fields during one or more planting seasons can be used at large scale with machine learning models to output in-season (or in different planting seasons) field-level predicted yield values. The disclosed approaches are effective in operating with a large volume of digital image data captured in-season for individual fields, unlike prior approaches. The disclosed approaches produce accurate yield estimates when the trained machine learning model is evaluated at different points in a season. Embodiments can balance computational load among on-prem and cloud-based computing resources for large datasets or small depending on the intermediate task required for computation. Consequently, growers have the opportunity to accurately predict yield at a field level rather than having to satisfy themselves with county-, state- or national-level yield estimates.

What is claimed is:

1. A computer-implemented method comprising:
    receiving, at an agricultural intelligence processing system, a plurality of digital images of a plurality of agricultural fields, each of the agricultural fields represented by one or more digital images obtained in-season or in different planting seasons, each digital image of an agricultural field comprising a set of pixels with pixel values, each pixel value of a pixel representing a set of spectral band intensities, each spectral band intensity of a set of spectral band intensities represented by a spectral band intensity value of one band among a plurality of bands of electromagnetic radiation;
    detecting one or more cloud-covered fields among the plurality of agricultural fields, a cloud-covered field having a pixel count exceeding a threshold cloud coverage level;
    removing all digital images of the detected one or more cloud-covered fields from the digital images of the plurality of agricultural fields; and then,
    for each of the agricultural fields, using all remaining digital images for that agricultural field, preprocessing spectral band intensity values for each band among the plurality of bands, resulting in storing a plurality of preprocessed intensity values at a field level for all the agricultural fields;
    inputting the stored plurality of preprocessed spectral band intensity values for a particular field to a trained machine learning model to result in obtaining output comprising a predicted yield value for that particular field or an agricultural field other than the particular field; and
    based on the predicted yield value, causing generating and displaying an updated field yield map of the particular field using a graphical user interface of a client computing device.

2. The method of claim 1, wherein the preprocessing further comprises:
    calculating an aggregated mean or histogram value of the spectral band intensity values of all digital images of the particular field for each band.

3. The method of claim 1, further comprising:
    applying the predicted yield value to one or more digital images of the particular field or the agricultural field other than the particular field in a subsequent planting season.

4. The method of claim 1, further comprising:
re-training the trained machine learning model with digital images of another field obtained during a subsequent planting season, the predicted yield value, or a combination thereof; and
periodically repeating re-training the trained machine learning model with a set of digital images obtained of the particular field, one or more agricultural fields other than the particular field, or a combination thereof, during subsequent planting seasons.

5. The method of claim 1, further comprising:
grouping the predicted yield value with a particular batch of a plurality of batches of sets of predicted yield data corresponding to a set of fields other than the particular field, each batch with a set of predicted yield data;
inputting the particular batch to the trained machine learning model; and
repeating the inputting function for batches other than the particular batch.

6. The method of claim 1, wherein predicted yield data of batches of sets of predicted yield data correspond to one or more regions of interest within an agricultural field.

7. The method of claim 1, wherein the plurality of bands of electromagnetic radiation includes at least Red, Green, Near-Infrared (NIR) and Red-Edge (RE).

8. The method of claim 1, further comprising applying one or more of image band normalization, temporal averaging, or determining location cross features to prepare features provided to the trained machine learning model.

9. A computer-implemented method comprising:
receiving, at an agricultural intelligence processing system, a plurality of digital images of a plurality of agricultural fields, each of the agricultural fields represented by one or more digital images obtained in-season or in different planting seasons, each digital image of an agricultural field comprising a set of pixels with pixel values, each pixel value of a pixel representing a set of spectral band intensities, each spectral band intensity of a set of spectral band intensities represented by a spectral band intensity value of one band among a plurality of bands of electromagnetic radiation;
for one or more agricultural fields with missing digital images, imputing a spectral band intensity value, per band, for each of the spectral band intensity values of a pixel of the set of pixels of digital images;
flagging the one or more agricultural fields with missing digital images with a missing image indicator(s);
for each of the agricultural fields, using all the digital images for that agricultural field, preprocessing spectral band intensity values for each band among the plurality of bands, resulting in storing a plurality of preprocessed intensity values at a field level for all the agricultural fields;
inputting the stored plurality of preprocessed spectral band intensity values for a particular field and the missing image indicator(s) to a trained machine learning model to result in obtaining output comprising a predicted yield value for that particular field or an agricultural field other than the particular field; and
based on the predicted yield value, causing generating and displaying an updated field yield map of the particular field using a graphical user interface of a client computing device.

10. The method of claim 9, wherein the preprocessing further comprises:
calculating an aggregated mean or histogram value of the spectral band intensity values of all digital images of the particular field for each band.

11. The method of claim 9, further comprising:
applying the predicted yield value to one or more digital images of the particular field or the agricultural field other than the particular field in a subsequent planting season.

12. The method of claim 9, further comprising:
re-training the trained machine learning model with digital images of another field obtained during a subsequent planting season, the predicted yield value, or a combination thereof; and
periodically repeating re-training the trained machine learning model with a set of digital images obtained of the particular field, one or more agricultural fields other than the particular field, or a combination thereof, during subsequent planting seasons.

13. The method of claim 9, further comprising:
grouping the predicted yield value with a particular batch of a plurality of batches of sets of predicted yield data corresponding to a set of fields other than the particular field, each batch with a set of predicted yield data;
inputting the particular batch to the trained machine learning model; and
repeating the inputting function for batches other than the particular batch.

14. The method of claim 9, wherein predicted yield data of batches of sets of predicted yield data correspond to one or more regions of interest within an agricultural field.

15. The method of claim 9, wherein the plurality of bands of electromagnetic radiation includes at least Red, Green, Near-Infrared (NIR) and Red-Edge (RE).

16. The method of claim 9, further comprising applying one or more of image band normalization, temporal averaging, or determining location cross features to prepare features provided to the trained machine learning model.

17. A system comprising:
one or more processors;
a memory storing instructions which, when executed by the one or more processors, cause performance of functions comprising:
receiving, at an agricultural intelligence computer system, a plurality of digital images of a plurality of agricultural fields, each of the agricultural fields represented by one or more digital images obtained in-season or in different planting seasons, each digital image of an agricultural field comprising a set of pixels with pixel values, each pixel value of a pixel representing a set of spectral band intensities, each spectral band intensity of a set of spectral band intensities represented by a spectral band intensity value of one band among a plurality of bands of electromagnetic radiation;
detecting one or more cloud-covered fields among the plurality of agricultural fields, a cloud-covered field having a pixel count exceeding a threshold cloud coverage level;
removing all digital images of the detected one or more cloud-covered fields from the digital images of the plurality of agricultural fields; and then,
for each of the agricultural fields, using all remaining digital images for that agricultural field, preprocessing, at field data preprocessing instructions, spectral band intensity values for each band among the plurality of bands, resulting in storing a plurality of preprocessed intensity values at a field level for all the agricultural fields;

inputting, at the field data processing instructions, the plurality of preprocessed spectral band intensity values for a particular field of the plurality of agricultural fields to a trained machine learning model to result in obtaining output comprising a predicted yield value for that particular field or an agricultural field other than the particular field; and based on the predicted yield value, causing generating and displaying an updated field yield map of the particular field using a graphical user interface of a client computing device.

18. The system of claim 17, wherein the instructions, when executed by the one or more processors, further cause performance of:

calculating an aggregated mean or histogram value of the spectral band intensity values of all digital images of the particular field for each band.

19. The system of claim 17, wherein the instructions, when executed by the one or more processors, further cause performance of:

applying the predicted yield value to one or more digital images of the particular field or the agricultural field other than the particular field in a subsequent planting season.

20. The system of claim 17, wherein the instructions, when executed by the one or more processors, further cause performance of:

re-training the trained machine learning model with digital images of another field obtained during a subsequent planting season, the predicted yield value, or a combination thereof; and periodically repeating re-training the trained machine learning model with a set of digital images obtained of the particular field, one or more other fields, or a combination thereof, during subsequent planting seasons.

21. The system of claim 17, wherein the instructions, when executed by the one or more processors, further cause performance of:

grouping the predicted yield value with a particular batch of a plurality of batches of sets of predicted yield data corresponding to a set of agricultural fields of the plurality of agricultural fields other than the particular field, each batch with a set of predicted yield data;

inputting the particular batch to the trained machine learning model; and repeating the inputting function for batches other than the particular batch.

22. The system of claim 21, wherein the predicted yield data of batches of sets of predicted yield data correspond to one or more regions of interest within an agricultural field.

23. The system of claim 17, wherein the instructions, when executed by the one or more processors, further cause performance of:

for one or more agricultural fields with missing digital images, imputing a spectral band intensity value, per band, for each of the spectral band intensity values of a pixel of the set of pixels of digital images; and flagging the one or more agricultural fields with missing digital images with a missing image indicator(s).

24. The system of claim 17, wherein the plurality of bands of electromagnetic radiation includes at least Red, Green, Near-Infrared (NIR) and Red-Edge (RE).

25. The system of claim 17, the memory storing instructions which, when executed by the one or more processors, cause performance of functions comprising applying one or more of image band normalization, temporal averaging, or determining location cross features to prepare features provided to the trained machine learning model.

* * * * *

UNITED STATES PATENT AND TRADEMARK OFFICE
CERTIFICATE OF CORRECTION

PATENT NO. : 11,574,465 B2
APPLICATION NO. : 16/725869
DATED : February 7, 2023
INVENTOR(S) : Chen et al.

It is certified that error appears in the above-identified patent and that said Letters Patent is hereby corrected as shown below:

In the Specification
In Column 1, Line 33, delete "yield predications" and insert -- yield predictions --, therefor.
In Column 13, Line 24, delete "primarily tillage;" and insert -- primary tillage; --, therefor.

Signed and Sealed this
First Day of August, 2023

Katherine Kelly Vidal
*Director of the United States Patent and Trademark Office*